April 28, 1942. M. A. BOSTWICK 2,280,885
NETWORK DISTRIBUTION SYSTEM
Filed May 27, 1939

WITNESSES:
Leon M. Garman
C. L. Friedman

INVENTOR
Myron A. Bostwick.
BY
ATTORNEY

Patented Apr. 28, 1942

2,280,885

UNITED STATES PATENT OFFICE

2,280,885

NETWORK DISTRIBUTION SYSTEM

Myron A. Bostwick, Budd Lake, N. J., assignor to Westinghouse Electric & Manufacturing Company, East Pittsburgh, Pa., a corporation of Pennsylvania Application May 27, 1939, Serial No. 276,063

8 Claims. (Cl. 175—294)

My invention relates to alternating current systems of distribution, and particularly to such systems of the network type. In network systems, a distribution network is supplied by means of a plurality of feeders through step-down transformers from one or more supply sources. The flow of power between the step-down transformers and the network is controlled by means of automatic switches known as network protectors.

It has heretofore been the practice in such systems to provide power directional relay apparatus for causing the network switches to trip open in response to a reverse power flow from the network to the feeder, and to cause the network switch to reclose when the voltage on the feeder side is higher than the voltage on the network side and bears such a phase relationship thereto as to cause power to flow from the feeder to the network immediately after closure of the network switch.

The latter operation of comparing the voltages on the feeder and on the network sides of the network switch is termed "phasing," and serves the following two purposes. First, the phasing operation prevents closure of the network switch if, in repairing a feeder fault, any two conductors of the feeder have been transposed, or if all three feeder conductors have been rotated 120° or 240°. Second, the phasing operation serves to prevent repeated opening and closing or "pumping" of the network switch in the event that the relationship of voltages on the feeder side and on the network side of the switch is such as to cause power flow from the network to the feeder when the switch is closed, and closure of the switch when the latter is open.

However, the second function cannot always be performed perfectly by a single network relay, and at many locations in the network it is necessary to provide the protectors with additional phasing relays to prevent pumping. Even when equipped with such phasing relays, many unnecessary operations of the network protectors occur because of reverse power flow at various points in the network, following the ordinary laws of power distribution through a network.

It is an object of my invention to provide a novel network protector which shall be controlled to open when the feeder is faulted, or when the feeder main breaker at the station is opened to disconnect the feeder entirely at times of light load, and which shall be controlled to remain closed during normal conditions, regardless of the magnitude or direction of power flow.

Another object of my invention is to provide a simplified and more economical network system, in which the power directional apparatus of the prior art shall be eliminated, and a more simple form of electro-responsive device substituted, which shall respond to feeder ground faults to trip the network breaker. With such a simplified tripping arrangement, I propose to use a simplified phasing arrangement which will operate to close the network switch when the magnitudes of feeder and of network voltages are approximately normal, and no crossed-phase connections exist.

As an additional control to prevent unnecessary pumping operations of the circuit breaker, I provide means for introducing a time delay in the reclosing control of the circuit breaker after each opening operation. In conjunction with such time delaying means, I provide means for permitting the reclosure of the circuit breaker to connect the transformer to the network when the network is entirely deenergized.

By use of the time-delay means, permanent locking out of the circuit breaker need not be resorted to, which might result in locking out the circuit breaker after a false operation. In addition to preventing pumping, the time-delay means is also arranged to permit immediate reclosure of an associated circuit breaker after it has been opened for any time in excess of the setting of the time-delay means.

A further object of my invention is to provide a simple system for controlling the connection of the network transformer to the network whether the network is otherwise energized or not.

The manner in which the system operates in accordance with the principles of my invention is illustrated in the accompanying diagrams of a network system including the several elements arranged according to the invention described herein.

Figure 1:
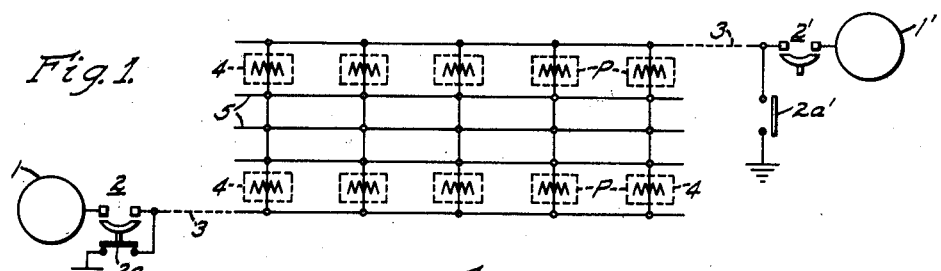
Figure 1 is a simple schematic single line diagram of a network system in which two feeders supply the network through several network protector units.
Figure 2:
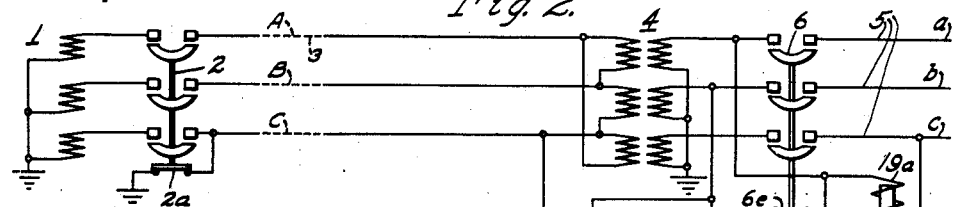
Fig. 2 is a diagram showing the transformer and circuit breaker of a network protector unit, together with the control equipment therefor.

As shown in the diagram, referring to Figure 1, a grounded neutral polyphase medium voltage source 1 is connected by means of a feeder circuit breaker 2 to a feeder circuit 3 having phase conductors A, B, C (Fig. 2). Suitable apparatus, shown diagrammatically as back contacts 2a of the feeder breaker 2, is provided for grounding one conductor of the feeder 3 whenever the feeder breaker 2 is open, whether due to a fault on the feeder, or to intentional manual opening to deenergize the feeder. The feeder breaker 2 is provided with fault-responsive apparatus for causing it to open in response to a fault on the feeder 3. As such apparatus forms no part of the present invention and is well known in the art, it has not been shown in the drawing. A second similar voltage source 1' is connected to a feeder 3' through a circuit breaker 2'. Adjacent the circuit breaker 2' a manually operated switch 2a' is employed for grounding one conductor of the feeder 3'. This manually operated switch may be employed in place of the back contacts 2a where desired. Each of the feeders is connected to a distribution network 5 through network protectors P.

At each network protector unit, as in Fig. 2, a step-down transformer bank 4 is connected between the feeder 3 or 3' and the low voltage distribution network 5. The transformer bank 4 is preferably connected with its high voltage windings in delta and its low voltage windings in star with neutral grounded, but other arrangements familiar to those skilled in the art may be used. The high voltage windings of the transformer bank 4 are ungrounded. Although, for simplicity, only one feeder 3 is shown in Fig. 1, it will be understood that the network 5 is supplied by a plurality of feeders, and each feeder is similarly connected to the network 5 by means of a plurality of transformer banks in accordance with the usual practice indicated in Fig. 1.

A network protector for each transformer bank 4 comprises a network circuit breaker 6 and its associated control apparatus which is provided for controlling the flow of power from the transformer bank 4 to the network 5. In accordance with my invention, any suitable apparatus responsive to a ground fault on the feeder 3 is provided for tripping open the network circuit breaker 6. This ground-responsive apparatus is shown as an electrostatic relay 7 connected to the high voltage terminals of the transformers 4 by means of a capacitor 8. The relay 7 is preferably provided with front and back contacts, and is designed to float between the contacts normally, but to engage one set of its contacts in response to a ground on any single conductor of the feeder 3. Upon the occurrence of a ground on one conductor of the feeder, the voltage to ground of the two ungrounded conductors rises approximately to 173% of normal voltage. The back contacts of the relay 7 close when a ground occurs on or is applied to the conductor to which the relay is connected; or in response to a drop in voltage to or below 30% of normal phase-to-ground voltage upon occurrence of a double-phase-to-ground fault or a three phase fault on the feeder 3. The front contacts of the relay 7 may be adjusted to close on an increase of the voltage applied thereto above 140% of normal phase-to-ground voltage. When the ground relay engages either set of contacts, it completes the tripping circuit to the trip coil 6c of the network breaker through an auxiliary front contact 6e on that breaker. Preferably, the relay 7 is provided with a suitable time delay, such as one second for under-voltage tripping, or it may have a similar time delay for both under-voltage and over-voltage tripping in order to prevent a disconnection of a sound feeder when a fault occurs on an adjacent feeder and to assure operation of the feeder breaker.

A voltage-responsive relay 9 is provided for controlling the closure of the network circuit breaker 6, when conditions are proper. The voltage-responsive relay 9 has a coil 9a connected to the output terminals of a positive phase-sequence voltage filter 10, to be energized in accordance with the positive symmetrical components of the polyphase voltage applied to the filter 10.

The positive phase-sequence voltage filter 10 is preferably of the type disclosed in the United States patent to B. E. Lenehan, No. 1,936,797, issued November 28, 1933, and assigned to the Westinghouse Electric & Manufacturing Company. This filter comprises an auto-transformer 10a, having a tap to provide a voltage less than half the total voltage impressed on the auto-transformer, for example, a 40% tap, and a reactor 10b and a resistor 10c. The reactor 10b and the resistor 10c are proportioned to produce, together, a 40% voltage drop in the resistor 10c lagging the impressed voltage across the resistor and the reactor by an angle of 60°. Assuming that the phase rotation of the secondary voltages of the transformer bank 4 to be $a$—$b$—$c$, as indicated by the sub-scripts $a$, $b$ and $c$ of the network conductors $a$, $b$ and $c$ and with the connections of the filter as indicated and as explained in the above-mentioned Lenehan patent, the coil 9a of the relay 9 responds to a positive symmetrical component of the polyphase voltage applied to the filter 10. The relay 9 is preferably designed to close when the positive symmetrical voltage components exceed a predetermined value, of the order of 90% to 95% of the normal phase-to-ground voltage of the network 5, thereby indicating normal circuit conditions.

Figure 4:
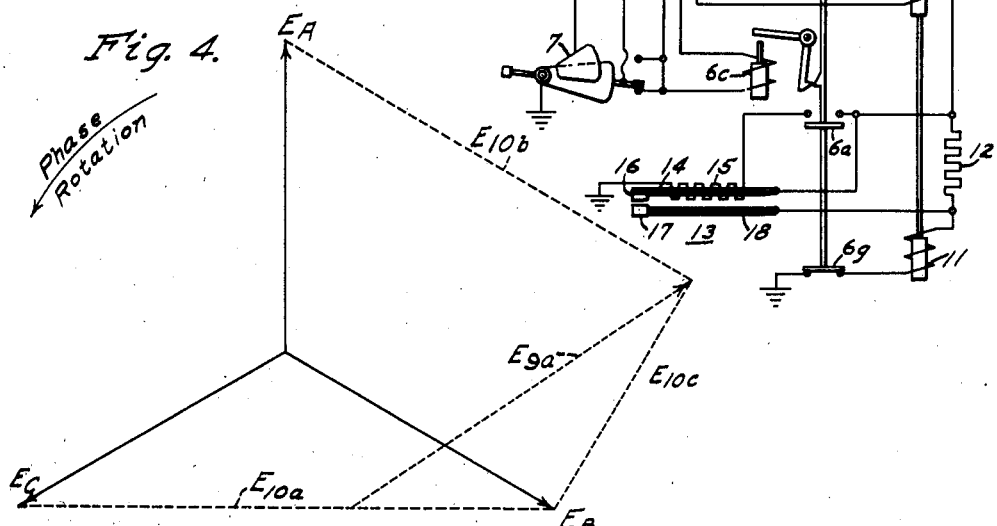
Fig. 4 is a vector diagram of voltage relationships in a filter employed in my invention.

Voltage relationships in the filter 10 are illustrated in Fig. 4 for the case in which positive sequence voltages $E_A$, $E_B$, $E_C$ are applied thereto. Phase rotation is assumed to be counterclockwise. The subscripts in Fig. 4 refer to the particular elements in Fig. 2 across which the voltages appear. It will be noted that the voltage $E_{9a}$ which is applied to the coil 9a is substantially in phase opposition to the voltage $E_C$.

The connection of the auto-transformer 10c to the phase conductor C is made to that conductor on the network side of the breaker, thereby providing a simple phasing circuit between the transformer and the network, as part of the positive phase-sequence filter. Such phasing circuit assures proper phase relationship and voltage between the transformer and network.

The relay 9 is also provided with a restraining coil 11 whose restraining torque is proportional to a network voltage, preferably the voltage to ground of the network phase conductor 5c to which the coil is connected in Fig. 2. The circuit of the restraining coil 11 includes a limiting resistor 12 that is short circuited during normal operating conditions, so that the restraining coil 11 will be fully energized by the voltage of the network conductor 5c.

The effectiveness of the resistor 12 to control the restraining coil 11 is governed by the operation of a timing switch 13, that is here illustrated as a device of the thermostatic or bimetal type. As illustrated in the diagram, the timing device 13 includes a bimetallic arm 14 that is arranged to be heated by a heating coil 15 energized from conductor 5c of the network through the contact 6a that is closed when the circuit breaker 6 is closed and that is open when the circuit breaker 6 is open. The bimetallic arm 14 operates a contact member 16 that cooperates with a second contact member 17 to establish a bridging circuit around the resistor 12. To compensate for variations in ambient temperatures, any conventional compensation may be employed. In Fig. 2, the contact 17 is mounted upon a bimetallic arm 18 that is affected only by ambient temperature but not by the heat from the coil 15.

When the circuit breaker 6 is closed, and the system is functioning normally to supply energy from the feeder through the network transformer 4 to the network system 5, the auxiliary contact 6a of the circuit breaker 6 will be closed to energize the heating coil 15 of the thermal timer 13. The bimetallic arm 14 will then be sufficiently heated to establish and maintain engagement between the two contacts 16 and 17 to short circuit the limiting resistor 12 in the circuit of the restraining coil 11.

During normal energy-delivering condition of the transformer, with the voltage on the secondary of the network transformer 4 normal, and when proper phase conditions prevail between the three terminals of the secondary windings of the transformer, and between those terminals and the network conductor C, the positive phase-sequence voltage impressed upon the operating coil of relay 9 will be sufficient to overcome the normal restraining effect of the restraining coil 11 when the contacts 16 and 17 are open. The operating coil of the relay 9 can normally be adjusted to pick up and close its contacts at 90% of normal voltage against the restraining torque of the restraining coil 11 at normal circuit voltage.

Upon opening of the circuit breaker 6 for any reason, as, for example, in response to the occurrence of a ground upon the feeder circuit due to a faulty condition or due to intentional grounding at the main station to open the network circuit breaker, the auxiliary switch 6a, of the network breaker 6, will be opened and the heating coil 15 of the thermal timer 13 will be deenergized. After a suitable time interval, for example, from 1 to 5 minutes, depending upon the setting of the timing device, the bimetal arm 14 will resume its normal unheated position and thereby disengage the contact 16 from the contact 17 to remove the short circuit around the resistor 12. The resistor will thus be introduced into the circuit of the restraining coil 11 and will diminish its energization to reduce the restraining torque that might be developed by it.

When the feeder is reenergized, after clearance of the ground on the feeder, whether by clearance of fault or whether by reclosure of the main feeder breaker to remove the artificial ground, the voltage relay 9 will be operated without appreciable restraint by the restraining coil 11, due to its diminished energization. Closure of the relay 9 completes a circuit for a closing motor or coil 6b on the circuit breaker through an auxiliary switch 6d on the circuit breaker which is closed when the circuit breaker is open.

Although not essential, a relay 19 may be provided to prevent operation of the closing coil 6b while the relay 7 is in tripping condition because of a defect otherwise. This relay 19 has a coil 19a which is energized when the relay 7 is in tripping condition to open the contacts 19b which are in the closing circuit of the closing coil 6b. When the relay 7 returns to its floating position, the relay 19 is deenergized and drops to close its contacts 19b.

In order to permit reclosure of the circuit breaker, the phase rotation of feeder voltages must be correct. If two feeder conductors are transposed during repairs the output of the voltage filter is substantially zero. Furthermore, if all three feeder conductors are rotated, the network conductor 5c no longer complements the feeder conductors A, B which are employed for energizing the voltage filter. Under these conditions, the relay 9 does not move to its closing position.

If the network 5 has been maintained energized by reason of its connection to an energizing source through some other feeder circuit than the feeder 3 which has been deenergized, the phase-sequence filter 10 will be fully energized and will be operative to impress normal positive phase-sequence voltage upon the operating coil of relay 9. The restraining coil will be only slightly energized in view of the limiting effect of the resistor 12 and the closing coil 9 will therefore close the circuit to the closing coil of the circuit breaker to reconnect the network transformer 4 to the network system 5.

If, however, the network 5 is entirely deenergized, as in a case where it is supplied with energy only through the feeder 3 which is now deenergized, the restraining coil 11 is entirely deenergized upon the opening of the network circuit breaker 4.

At the same time, however, one phase connection of the positive phase sequence and phasing equipment 10, which serves to provide the phasing circuit, is deenergized and the voltage available to energize the closing coil 9a of relay 9 is only about half of the normal positive phase-sequence voltage available under normal voltage conditions. That partial voltage is sufficient, however, to operate the relay, since, in this case, the restraining torque of the restraining coil 11 is entirely removed.

By means of this arrangement the phasing equipment may be arranged to establish the connection of the network transformer to the network even though the network is entirely deenergized.

In addition, the timing device serves to prevent excessive pumping operations such as might occur, for example, if the network circuit breakers were permitted to reclose immediately, after an opening operation, during an interval immediately following the disconnection of the main feeder at the main station, but before all of the circuit breakers fed by that feeder were opened, or for other reasons. By providing the time delay in reclosing, however, sufficient time is assured to permit the opening of all of the circuit breakers connected to the same feeder, so that once the network breaker has opened in response to the opening of the feeder circuit at the main station, the network breaker will not immediately pump and reclose before all of the other circuit breakers connected to the same feeder can open to disconnect the feeder entirely from the network.

By means of the arrangement shown, a simple and economical control is provided for a network unit.

The opening of the network breaker is controlled by the ground relay 7, which will respond to a ground fault on the system, or to an artificial ground following an automatic or intentional opening of the main feeder breaker at the station.

The closing of the network breaker is controlled by the positive phase-sequence filter according to proper phase and voltage conditions between the transformer and the network, whether the network is otherwise energized or not.

In addition, the closing of the network breaker is controlled to permit the expiration of a predetermined minimum time interval after the opening of a network breaker, to prevent pumping, and to assure that no reclosures will occur until all the network units supplied from one feeder have time to be disconnected, when the feeder is opened and deenergized at the main station.

The filter 10 and relay 9 have no function to perform while the circuit breaker 6 is in its closed condition. Although they may be left permanently in circuit, it may be desirable to disconnect them by means of the auxiliary switch 6d and auxiliary switches 6f and 6g which are closed when the circuit breaker is open. When the circuit breaker is in its closed position, these switches 6d, 6f, 6g are open, and interrupt the flow of current to the voltage filter 10 and the coil 11.

Figure 3:
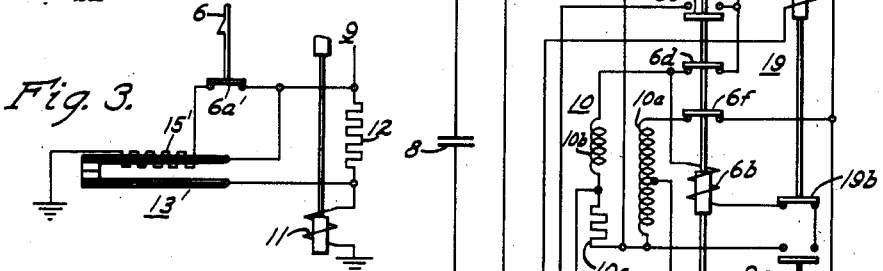
Fig. 3 is a diagrammatic view of a modified timer suitable for utilization in my invention.

In Fig. 3 a modified timer is illustrated for controlling the resistor 12. The circuit breaker 6, relay 9, restraining coil 11 and resistor 12 of Fig. 3 are the same as the corresponding elements of Fig. 2. However, the thermal relay 13', when deenergized, has its contacts closed to establish a shunt across the resistor 12. When the circuit breaker 6 opens it closes a pair of back contacts 6a' which establish an energizing circuit for the heating element 15' of the relay 13'. After a predetermined time has elapsed the thermal relay 13' opens its contacts to open the shunt across the resistor 12. This decreases the restraint offered by the coil 11 and permits reclosure of the circuit breaker 6.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a polyphase electrical distribution system, a first polyphase circuit, a second polyphase circuit, coupling means including a switch for said polyphase circuits, said circuits normally being energized by similar polyphase voltages, means for deriving in part from said first circuit and in part from said second circuit, an alternating voltage dependent on a polyphase symmetrical phase-sequence component of the energization of said circuits, control means responsive to said alternating voltage and means for compensating said control means for variations resulting from a change in the energization of one of said circuits relative to the other of said circuits, said last-named means including means energized in accordance with an alternating voltage from the circuit subject to said change which normally is substantially in phase opposition to said first-named alternating voltage.

2. In a polyphase electrical distribution system, a first three-phase circuit, a second three-phase circuit, said circuits normally being energized by substantially similar polyphase voltages, means for connecting and disconnecting said circuits, a symmetrical phase-sequence voltage filter connected for energization from two phase-conductors of said first three-phase circuit and from that phase-conductor of said second three-phase circuit which normally is connected to the remaining phase-conductor of said first three-phase circuit through said connecting and disconnecting means, means energized from said second three-phase circuit in accordance with a voltage normally substantially in phase opposition to the output voltage of said filter, and control means responsive to the difference between said voltages.

3. In a polyphase electrical distribution system, a three-phase circuit having a neutral, switch means for disconnecting two portions of said three-phase circuit, a phase-sequence voltage filter having a separate terminal connected to each phase-conductor of said three-phase circuit, two of said terminals being connected to said three-phase circuit on one side of said switch means, and the third of said terminals being connected to said three-phase circuit on the opposite side of said switch means, and control means differentially energized from the output of said voltage filter and from the voltage between said third terminal and neutral of said three-phase circuit.

4. In a polyphase electrical distribution system, a three-phase circuit having a neutral, switch means for disconnecting two portions of said three-phase circuit, a phase-sequence voltage filter having a separate terminal connected to each phase-conductor of said three-phase circuit, two of said terminals being connected to said three-phase circuit on one side of said switch means, and the third of said terminals being connected to said three-phase circuit on the opposite side of said switch means, closing means for said switch means, and control means differentially energized from the output of said voltage filter and from the voltage between said third terminal and neutral of said three-phase circuit for controlling the energization of said closing means.

5. In a network system, the combination with a network, a feeder circuit, and a circuit breaker between the feeder circuit and the network and provided with a closing means, of a relay for controlling the energization of the closing means for the circuit breaker, said relay comprising an operating coil and a counter-acting restraining coil, means for energizing the operating coil with a voltage derived from the feeder side and from the network side of the circuit breaker, means for energizing the restraining coil with a voltage derived from the network, and means controlled by the circuit breaker for modifying the circuit of the restraining coil to modify the effectiveness of the restraining coil under predetermined conditions.

6. In a network system, the combination with a transformer connected to a feeder circuit, a network, and a circuit breaker between the transformer and the network and provided with a closing means, of a relay for controlling the energization of the closing means for the circuit breaker, said relay comprising an operating coil and a counter-acting restraining coil, means for energizing the operating coil with a voltage derived from the transformer side and from the network side of the circuit breaker, means for energizing the restraining coil with a voltage derived from the network, and means controlled by the circuit breaker to insert a resistor into the circuit of the restraining coil a predetermined time interval after the breaker opens, thereby to diminish the effectiveness of the restraining coil to permit the breaker to close.

7. In a network system, the combination with a transformer connected to a feeder circuit, a network, and a circuit breaker between the transformer and the network and provided with a closing means, of a relay for controlling the energization of the closing means for the circuit breaker, said relay comprising an operating coil and a counter-acting restraining coil, a positive phase-sequence voltage filter connected to the circuit between the transformer and the circuit breaker and to one phase-conductor of the network on the other side of the breaker, means connecting the operating coil of the relay to the phase-sequence filter, means connecting the restraining coil of the relay to the network, and time-controlled means controlled by the breaker for diminishing the effectiveness of the restraining coil only after the breaker has been open for a predetermined interval of time.

8. In a network system, the combination with a transformer connected to a feeder circuit, a network, and a circuit breaker between the transformer and the network and provided with a closing means, of a relay for controlling the energization of the closing means for the circuit breaker, said relay comprising an operating coil and a counter-acting restraining coil, a positive phase-sequence voltage filter partly connected to the low-tension side of the transformer and having one phase connection to the network to enable the phase-sequence filter to serve also as a phasing device, means connecting the operating coil of the closing control relay in the output circuit of the filter, means connecting the restraining coil of said control relay to the network, and means controlled by the circuit breaker, and operative after the expiration of a predetermined time interval following the opening of the breaker, to diminish the effectiveness of the restraining coil so the breaker can be reclosed on a dead network even though the filter voltage applied to the operating coil of the control relay is below the normal operating voltage to be applied to that coil.

MYRON A. BOSTWICK.